(12) United States Patent
Borretti et al.

(10) Patent No.: US 12,007,836 B2
(45) Date of Patent: Jun. 11, 2024

(54) PARAMETERIZATION PROCESS AND SYSTEM FOR A VEHICLE

(71) Applicant: Dana Motion Systems Italia S.R.L., Reggio Emilia (IT)

(72) Inventors: Biagio Borretti, Modena (IT); Peter Deckmyn, Koekelare (BE); Kris Vanstechelman, Bruges (BE); Christophe De Buyser, Veldegem (BE); Claudio Angeloni, Arco (IT)

(73) Assignee: DANA MOTION SYSTEMS ITALIA S.R.L., Reggio Emilia (IT)

( * ) Notice: Subject to any disclaimer, the term of this patent is extended or adjusted under 35 U.S.C. 154(b) by 0 days.

(21) Appl. No.: 17/930,660

(22) Filed: Sep. 8, 2022

(65) Prior Publication Data
US 2024/0086276 A1    Mar. 14, 2024

(51) Int. Cl.
*H03M 13/00*     (2006.01)
*G06F 11/07*     (2006.01)
*G06F 11/10*     (2006.01)

(52) U.S. Cl.
CPC ...... *G06F 11/1004* (2013.01); *G06F 11/0793* (2013.01)

(58) Field of Classification Search
CPC ................ G06F 11/1004; G06F 11/10793
See application file for complete search history.

(56) References Cited

U.S. PATENT DOCUMENTS

| | | | |
|---|---|---|---|
| 2008/0279056 A1* | 11/2008 | Chao | G11B 7/094 369/44.11 |
| 2009/0125760 A1 | 5/2009 | Schlette | |
| 2017/0102878 A1* | 4/2017 | Mundt | G06F 3/0653 |
| 2022/0153287 A1* | 5/2022 | Stählin | G07C 5/02 |

FOREIGN PATENT DOCUMENTS

| | | |
|---|---|---|
| DE | 102010026392 A1 | 1/2012 |
| DE | 102018112584 A1 | 11/2019 |
| EP | 1662346 B1 | 7/2011 |

OTHER PUBLICATIONS

"PVED-CLS Controller For Electro-hydraulic Steering Safety Manual," Danfoss Website, Available Online at https://files.danfoss.com/download/PowerSolutions/Steering/Electrohydraulic%20steering%20components/PVED-CLS/PVED-CLS%20Safety%20Manual_SW1.97.pdf, Retrieved on Sep. 8, 2022, 121 pages.

* cited by examiner

*Primary Examiner* — Christine T. Tu
(74) *Attorney, Agent, or Firm* — McCoy Russell LLP

(57) ABSTRACT

Methods and systems are disclosed for sending a first parameter of a plurality of parameters to a third dedicated address of a plurality of addresses in memory, updating a parameter flag value in a first dedicated address in memory, updating a cyclic redundancy check (CRC) value for the parameter flag in a second dedicated address in memory, writing a first parameter value for the first parameter in the third dedicated address and updating the CRC value of the first parameter to a fourth dedicated address in memory, sending a second parameter to a fifth dedicated address of the plurality of addresses in memory, writing a second parameter value for the second parameter in the fifth dedicated address and updating the CRC value of the second parameter in a sixth dedicated address, and identifying a monitoring result between read values and expected values.

20 Claims, 5 Drawing Sheets

PARAMETERIZATION PROCESS AND SYSTEM FOR A VEHICLE

TECHNICAL FIELD

The present disclosure relates generally to systems and methods for vehicle parameterization functional diagnostics.

BACKGROUND AND SUMMARY

Vehicle performance may be improved by monitoring the integrity of performance data and flagging issues with the performance data. Instructions configured, stored, and executed in a computing device that are compliant with applicable standards may be used to monitor the data and detect errors with the data. The instructions may be utilized in different variants of the same vehicle or different vehicles. As such, instructions that are compliant with applicable standards may run comparably in vehicles with different configurations (e.g., different sensors or parts). For example, a vehicle equipped with a type A joystick may operate similarly to a vehicle equipped with a type B joystick.

DE 10 2018 112 584 A1 to Hallek et al. discloses a configuration data monitoring method and a computer program that implements the method and configures a sensor device. The method includes reading sensor configuration data stored in volatile memory by a data source (e.g., electronic control unit (ECU)) and calculating cyclic redundancy check (CRC) values for error detection. Configuration data values are stored in designated data blocks wherein each data block has a corresponding cyclic redundancy check (CRC) value. Designated data blocks in volatile memory store the CRC values of the sensor configuration data blocks. The CRC value data blocks are separate from the sensor configuration data blocks and are stored in different locations in memory. The method further includes recalculating CRC values when a pre-determined scenario occurs, comparing the recalculated CRC value with the initial value stored in volatile memory, and providing a monitoring result. The monitoring result is based on diagnostic information stored in volatile data memory wherein each data block may at least have a binary flag that indicates whether there was an error with the data block.

The disclosure discussed above relies on data blocks with designated locations in memory with a corresponding CRC value that is stored in a separate designated address in volatile memory. The configuration data is stored in these blocks. While such an approach may save space in memory as parameters do not have individually calculated CRC values, depending on how the configuration data is organized in memory, the configuration data is potentially monitored as a parameter set. In this way, individual configuration data parameter degradation may occur and go undetected. Thus, monitoring configuration data in this manner may result in the error detection method not detecting errors with individual configuration parameters since the method relies on the CRC of the data block.

The inventors herein have recognized the above issues and provide approaches to at least partially address them, including sending a first parameter of a plurality of parameters to a third dedicated address of a plurality of addresses in memory, updating a parameter flag value for a parameter flag in a first dedicated address of the plurality of addresses in memory, updating a cyclic redundancy check (CRC) value for the parameter flag in a second dedicated address of the plurality of addresses in memory, writing a first parameter value for the first parameter in the third dedicated address and updating a CRC value of the first parameter to a fourth dedicated address of the plurality of addresses in memory, sending a second parameter of the plurality of parameters to a fifth dedicated address of the plurality of addresses in memory, writing a second parameter value for the second parameter in the fifth dedicated address and updating a CRC value of the second parameter in a sixth dedicated address, and identifying a monitoring result between read values in dedicated addresses in memory for the plurality of parameters and corresponding CRC values for the plurality of parameters and expected values for the plurality of parameters and corresponding CRC values for the plurality of parameters that are determined based on parameter values of the plurality of parameters sent to dedicated addresses in memory.

In this way, individual configuration parameters are monitored individually and discrepancies between read values and expected values may be identified for individual parameters which may increase the reliability of the vehicle operation. Additionally, the disclosed approach may reduce data corruption as data redundancy is introduced into non-volatile memory. Storing the CRC values in a separate location from the parameter values may allow at least one of the values to remain uncorrupted in the case where memory is physically damaged and the data value is inaccessible, and the like.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

The methods and systems described herein relate to a structure for increasing the reliability and control of data monitoring in a vehicle by communicatively coupling instructions stored in memory that are compliant with applicable standards and an electronic control unit (ECU) in a vehicle. In particular, systems and methods are provided for parameterization of the ECU in the vehicle via instructions stored and executed in at least one of an electronic device, such as a computing device, or the ECU to increase operability of vehicle components, such as sensors and actuators. The parameter values of a plurality of parameters may be stored in at least one memory of a plurality of memories of the ECU. As such, each parameter value for the plurality of parameters may be stored in at least one dedicated address of a plurality of addresses in memory of the ECU, and a corresponding cyclic redundancy check (CRC) value for the plurality of parameters may be calculated and stored in at least one dedicated address of the plurality of addresses in the ECU that is separate and distinct from the address (or location) in memory storing the parameter value. Further, a parameter flag and corresponding CRC of the parameter flag may be used to identify, track, communicate, and respond to issues with the parameterization of the ECU. In this way, the efficiency of the ECU parameterization may increase, which improves real-time processing performance and monitoring, and the frequency of operating a vehicle with system degradation may decrease.

Figure 1:
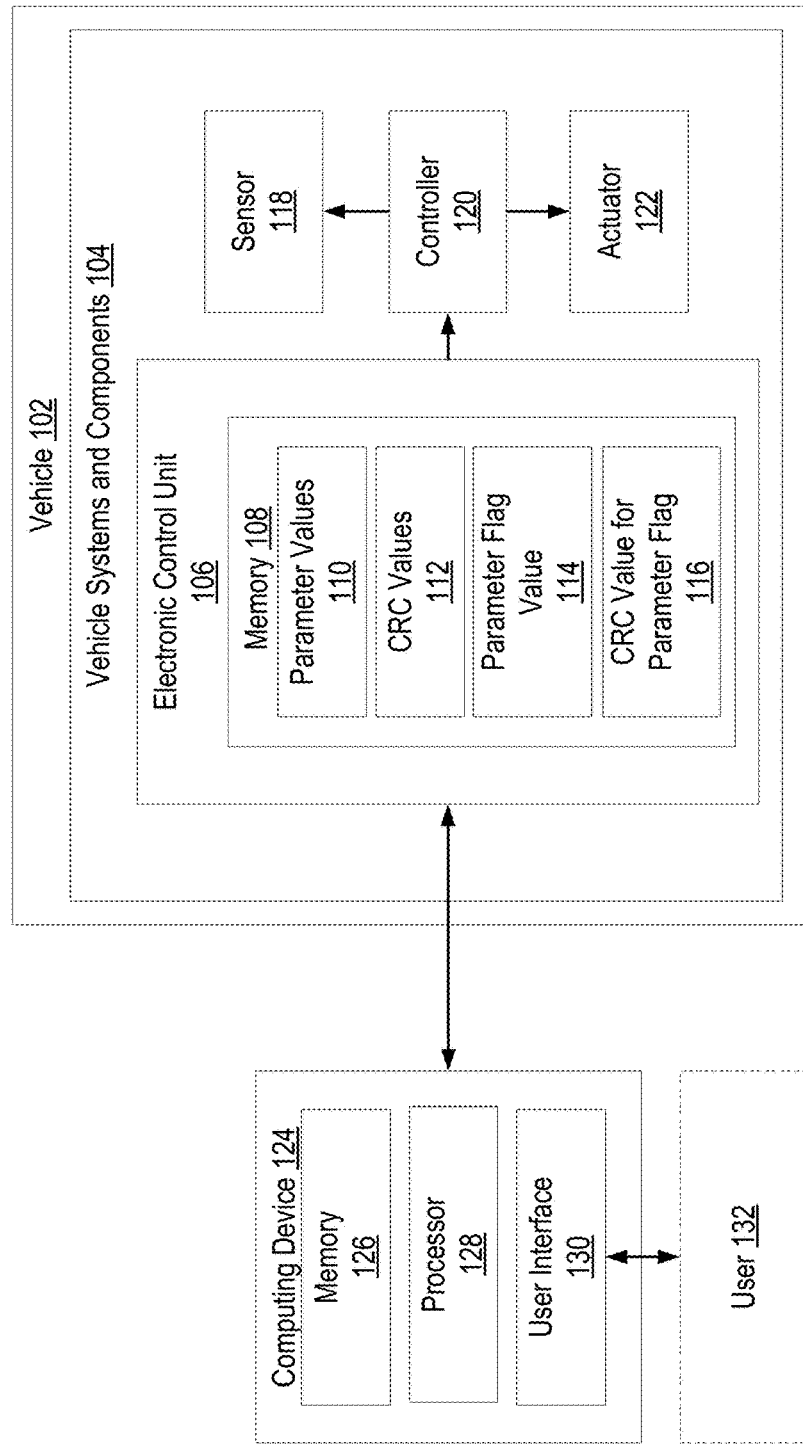
FIG. 1 is a block diagram representation of a vehicle communicatively coupled with instructions in a computing device.
Figure 2:
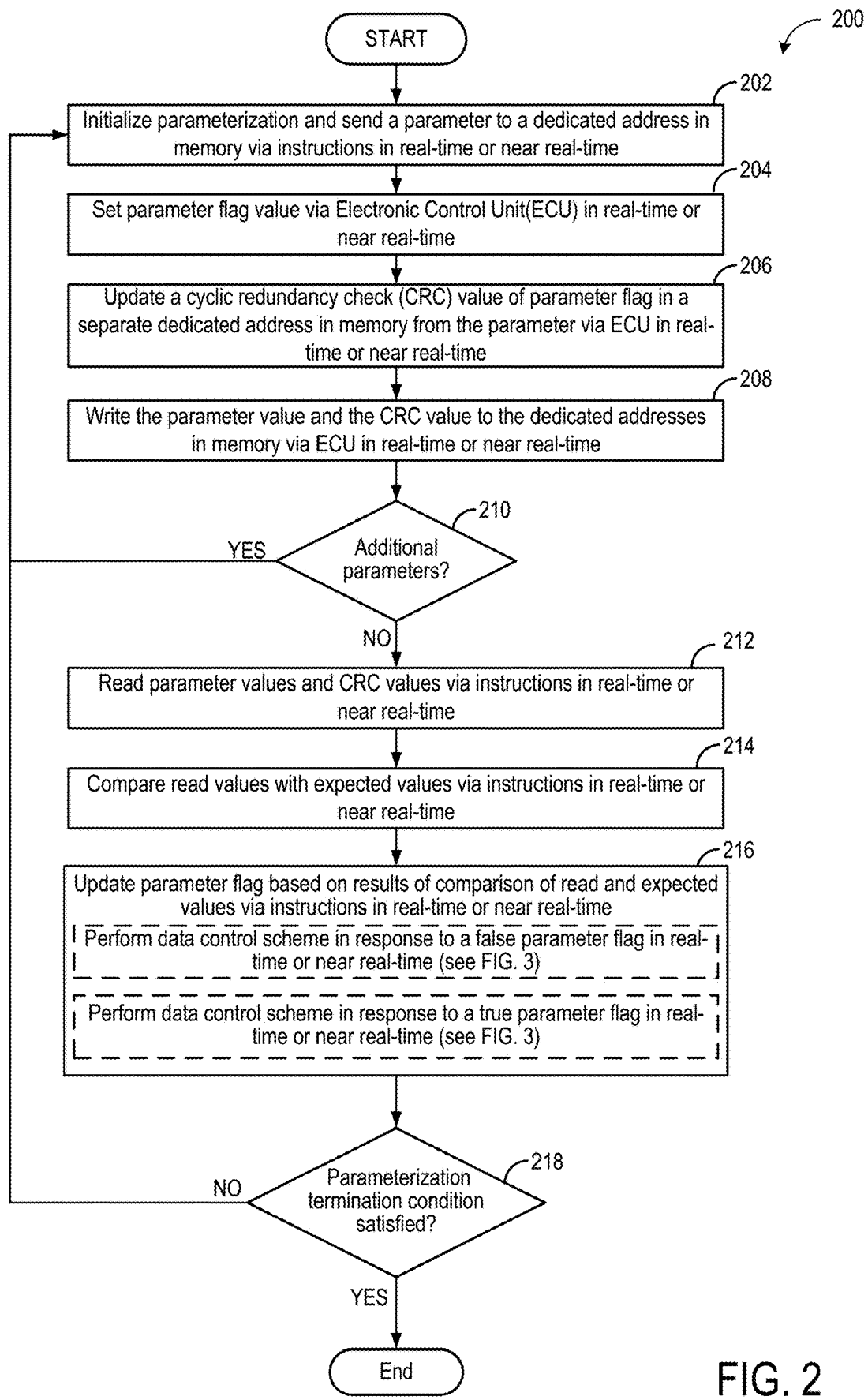
FIG. 2 is a flow diagram representation of a method for parameterization of an electronic control unit (ECU) of a vehicle via instructions.
Figure 3:
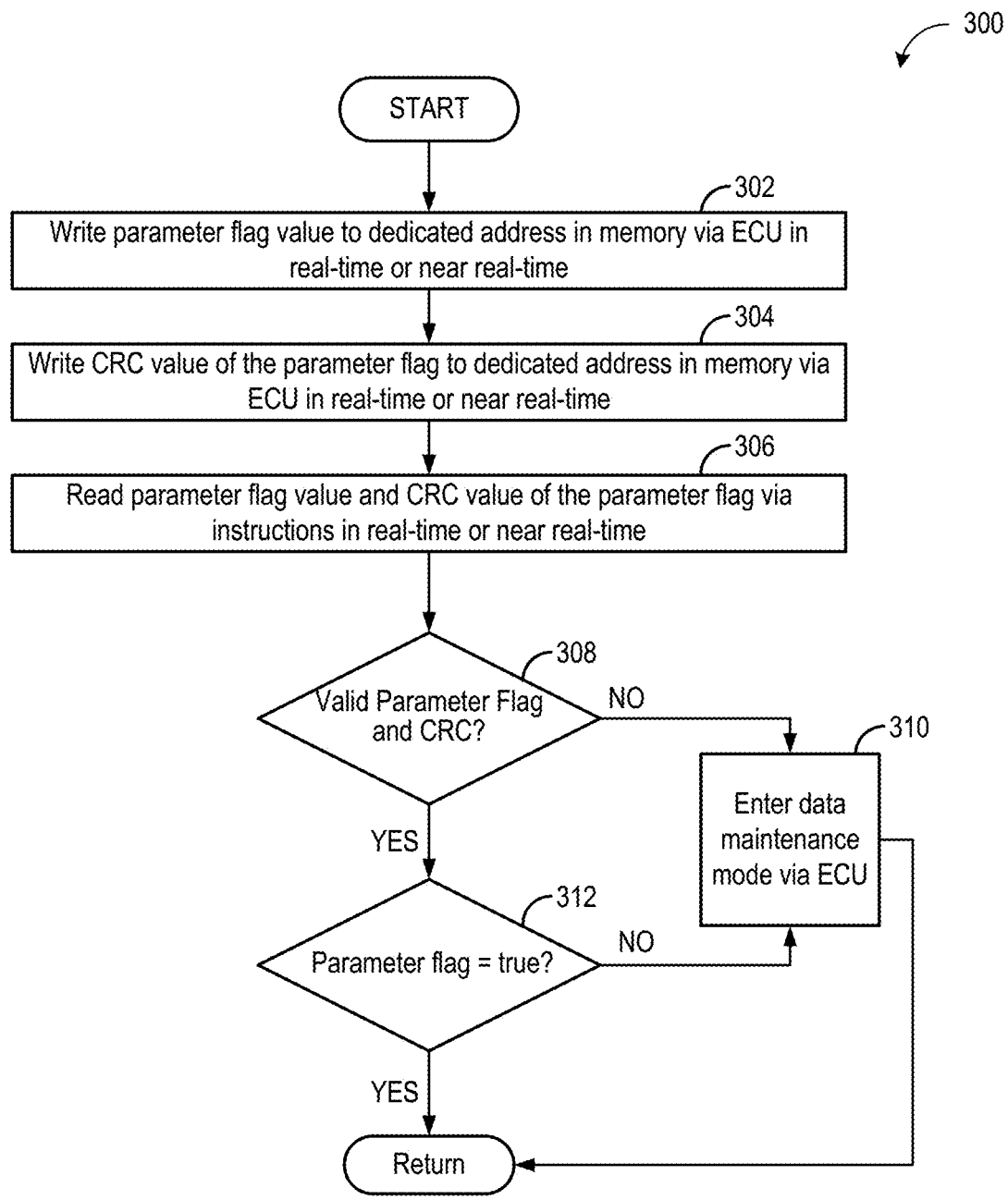
FIG. 3 is a flow diagram representation of a method for implementing a first data control scheme and a second data controls scheme.

A working system that communicatively couples data monitoring and control instructions to an ECU in a vehicle is shown in FIG. 1. The figure further describes the configuration of vehicle components in relation to the ECU. FIG. 2 describes a method for parameterization of the ECU via the instructions. A method that utilizes the parameter flag for error handling during the data monitoring process is illustrated in FIG. 3. A schematic diagram illustrates memory allocation of the plurality of parameters and corresponding CRC values of the plurality of parameters response to detecting no invalid values or differences between values during parameterization in FIG. 4. As shown in FIG. 5, a schematic diagram illustrates memory allocation of the plurality of parameters and corresponding CRC values of the plurality of parameters in response to detecting invalid values or differences between values during parameterization.

Referring to FIG. 1, an in vehicle performance system 100 that utilizes instructions to parameterize a control unit of a vehicle to increase the performance and reliability of the vehicle. The instructions may comprise an error detection component that may accurately update parameter values for a plurality of parameters that impact vehicle performance and use flags to alert the system when errors are detected. Vehicle systems and components are configured by the parameters values stored in an electronic control unit (ECU) after the parameterization of the in vehicle performance system 100.

The in vehicle performance system 100 may comprise a vehicle 102. In various embodiments, vehicle 102 may be an electric vehicle, a hybrid vehicle, and the like. The vehicle 102 may include vehicle systems and components 104, which may include but is not limited to a motor, a battery/fuel cell, a transmission, a suspension system, a brake system, a vehicle heating, ventilation, and cooling (HVAC) system, and cabin accessories. Additionally, the vehicle 102 may include an electronic control unit (ECU) 106.

The ECU 106 may comprise a memory 108 of a plurality of memories that includes dedicated addresses in memory for parameter values 110 for the plurality of parameters, CRC values 112 for the plurality of parameters, a parameter flag value 114 for a parameter flag, and a CRC value 116 for the parameter flag. In one embodiment of the present disclosure, the parameter values 110 for the plurality of parameters may be a plurality of operating parameters, which may include a first operating parameter and a second operating parameter, of the vehicle 102 that configure the vehicle 102 and impact vehicle performance. It may be understood that the dedicated addresses in memory 108 for the parameter values 110 and parameter flag value 114 may be distinct and separate from the dedicated addresses in memory 108 for the CRC values 112 for the plurality of parameters and the CRC value 116 of the parameter flag. In one such embodiment, the dedicated addresses in memory 108 for the parameter values 110 of the plurality of parameters may be distinct and separate from the dedicated address in memory 108 for the parameter flag value 114 of the parameter flag. Accordingly, the dedicated addresses in memory 108 for the CRC values 112 of the plurality of parameters may be distinct and separate from the dedicated address in memory 108 for the CRC value 116 of the parameter flag. In other embodiments of the present disclosure, at least one memory in the plurality of memories may store and execute instructions for parameterization of the ECU 106 of the vehicle 102.

The vehicle systems and components may further include a controller 120 of a plurality of controllers, a sensor 118 of a plurality of sensors, and an actuator 122 of a plurality of actuators. As such, the ECU 106 may be electronically coupled to the controller 120 to configure the controller based on the parameter values 110 stored in the memory 108. In this way, the sensor 118 of the plurality of sensors and actuator 122 of the plurality of actuators may be configured by the controller 120 based on the parameter values 110. In one embodiment, at least one controller in the plurality of controllers may configure the plurality of sensors and not configure the plurality of actuators based on the parameter values 110. For example, the controller 120 may configure the plurality of sensors or a subset of the plurality of sensors and not configure the plurality of actuators. In particular, another controller in the plurality of controllers other than the controller 120 may configure the plurality of actuators. In another embodiment, at least one controller in the plurality of controllers may not configure the plurality of sensors and configure the plurality of actuators based on the parameter values 110. In one example, the controller 120 may not configure the plurality of sensors and may configure the plurality of actuators or subset of the plurality of actuators. Another controller other than the controller 120 may configure the plurality of sensors. Another embodiment of the present disclosure may utilize the controller 120 to configure actuators and sensors in a particular system of the vehicle 102, such as the motor or brake system. Other embodiments of the present disclosure may utilize alternative configuration schemes to configure the plurality of actuators and plurality of sensors via controller 120 and the plurality of controllers than described herein.

Additionally, the in vehicle performance system 100 may include a computing device 124 that includes a memory 126, a processor 128, and a user interface 130. The processor 128 may execute instructions stored in memory 126, including the instructions for parameterization. As discussed herein, memory 126 may include a non-transitory computer readable medium in which instructions are stored. For the purposes of this disclosure, the term "non-transitory computer readable medium" is expressly defined to include various types of computer readable storage, which in various embodiments may include a non-transitory computer readable medium such as a flash memory, a read only memory (ROM), a random access memory (RAM), a cache, or any other storage media (e.g., a tangible medium) in which information is stored for any duration (e.g., for extended period time periods, permanently, brief instances, for temporarily buffering, and/or for caching of the information). Computer memory of computer readable storage mediums as referenced herein may include volatile and non-volatile or removable and non-removable media for a storage of electronic-formatted information such as computer readable program instructions or modules of computer readable program instructions, data, and the like that may be stand-alone or as part of a computing device. Examples of computer memory may include any other medium which can be used to store the desired electronic format of information and which can be accessed by the processor or processors or at least a portion of a computing device. Various methods and systems disclosed herein may be implemented using instructions (e.g., programming instructions, coded instructions, executable instructions, computer readable instructions, and the like) stored in a non-transitory computer readable medium.

The user interface 130 may comprise a display device and a user input device. Examples of display devices may include one or more display devices utilizing various types of display technology. In some embodiments, the display device may comprise a computer monitor. The display device may be combined with the memory 126, the processor 128, and/or the user input device in a shared enclosure or may be a peripheral display device. The display device may include a monitor, a touchscreen, or another type of display device, which may enable a user 132 to interact with computing device 124 and execute instructions for parameterization or interact with various data stored in the memory 126. In one embodiment of the present disclosure, a service tool for the vehicle 102 comprising the instructions and pre-programmed algorithms for parameterization may connect to the ECU for parameterization.

The user input device may comprise one or more of a keyboard, a mouse, a trackpad, or other device configured to enable a user to interact with and manipulate data stored within the memory 126 via the instructions. The user 132 may pre-program instructions for parameterization via the user interface 130. In one embodiment, the instructions may perform data monitoring and error detection functionalities. In another embodiment, the pre-programmed instructions may be included in the service tool of the vehicle 102. Additionally, the instructions may be coupled to the ECU 106 via the computing device 124. In this way, the computing device 124 may be able to send the plurality of parameters to dedicated addresses in memory 108, write parameter values 110 for the plurality of parameters to the dedicated address in memory 108, and read the parameter values 110 of the plurality of parameters, the CRC values 112 for the plurality of parameters, the parameter flag value 114 for the parameter flag, and the CRC value 116 for the parameter flag in the dedicated addresses in memory 108. In some embodiments, the instructions for parameterization may be stored in the ECU 106 rather than the computing device 124.

The parameter values 110 of the plurality of parameters may include various pre-determined performance standards such as pressure, temperature, relative location, and the like of the vehicle system and components 104. In one example, the parameter values 110 of the plurality of parameters may include the relative location of a brake pedal in the brake system. In another example, the parameter values 110 of the plurality of parameters may include engine temperatures. The CRC values 112 may be calculated based on the parameter values 110 via instructions in the computing device 124 or the ECU 106. In one embodiment, the check algorithm utilized in the instructions and the ECU 106 may be similar or the same. In another embodiment, the check algorithm may be included in the service tool of the vehicle 102. In one embodiment of the disclosure, the parameter flag value 114 may include a binary flag.

Turning to FIG. 2, a method 200 is described wherein instructions (e.g., the data monitoring and error detection instructions mentioned in FIG. 1) is communicatively coupled to an electronic control unit (e.g., ECU 106 in FIG. 1) to monitor and control configuration parameters of various systems and components of a vehicle. In one embodiment, the method 200 is performed by the in vehicle performance system 100 of FIG. 1. As such, the method 200 is described with respect to the system and components described above with respect to FIG. 1 but may be carried out with other systems/components without departing from the scope of this disclosure. The method 200 and the remaining methods included herein may be executed by at least one processor (e.g., the processor 128 of FIG. 1) according to instructions in memory (e.g., memory 126 of FIG. 1) of the in vehicle performance system 100 in FIG. 1.

At 202, the method 200 includes initializing parameterization and sending a parameter to a dedicated address in memory via instructions in real-time and/or near real-time. Before changes are made to memory (e.g., the memory 108 in FIG. 1) of an electronic control unit (ECU), instructions for parameterization communicate with the ECU to initialize the parameterization process. In one embodiment, the instructions may be part of a service tool of the vehicle that stores and executes the instructions in memory of a computing device. In another embodiment, the instructions may be a part of a service tool of the vehicle that stores and executes the instructions in at least one memory of a plurality of memories in the ECU. In other embodiments, the instructions may be stored and executed according to other systems and components than described herein. For example, some embodiments may not store and execute instructions in the computing device or the ECU.

In one example of an initialization condition, a message or command may be transmitted to the ECU and recognized by the ECU. In one embodiment, sending a first parameter to a third dedicated address via the instructions to the ECU may satisfy the initialization condition. As such, the ECU may enter a writing mode in response to the initialization condition being satisfied wherein the ECU may modify a parameter value for the plurality of parameters in a dedicated address in memory. The writing mode of the ECU may enable the parameter value of the plurality of parameters sent by the instructions to be written to the dedicated address of a plurality of addresses in memory for that particular parameter.

Similarly, the ECU may enter a calculating mode in response to the initialization condition being satisfied. The calculating mode of the ECU may utilize the parameter value to calculate a cyclic redundancy check (CRC) value. After the CRC value has been calculated by the calculating mode of the ECU, the writing mode enables the CRC value to be written into a dedicated address in memory that is separate from the parameter value sent via the instructions.

At 204, the method 200 includes setting a parameter flag value via an electronic control unit (ECU) in real-time or near real-time. A pre-determined condition that may be recognized by the ECU to enable the writing mode and calculating mode of the ECU may include the parameter flag value for a parameter flag in a dedicated address of the plurality of addresses changing from one pre-determined value to another pre-determined value. In one embodiment, the parameter flag value of the parameter flag may initially be set at a value of true if the parameter flag is binary, and after initialization of the parameterization, the ECU may set the parameter flag value of the parameter flag to false. In another embodiment, the parameter flag value for the parameter flag may initially be set at a value of false if the parameter is binary, and after initialization, the ECU may set the parameter flag value for the parameter flag to true. The examples provided are illustrative and do not limit the scope of the disclosure. Other embodiments may utilize different pre-determined conditions.

At 206, the method 200 includes updating a cyclic redundancy check (CRC) value of the parameter flag in a separate dedicated address in memory from the parameter flag via the ECU in real-time or near real-time. The calculating mode of the ECU is enabled allowing the ECU to read the parameter flag value for the parameter flag in the dedicated address of the parameter flag and calculate a corresponding CRC value for the parameter flag based on the updated parameter flag value. After calculating the corresponding CRC value of the parameter flag, the corresponding CRC value of the parameter flag is written to a dedicated address in at least one memory that is separate and distinct from the dedicated address in memory for the parameter flag value of the parameter flag via the writing mode of the ECU.

Some parameterization systems may implement a flagging system (e.g., a cyclic redundancy check (CRC)) that utilizes various parameter flags to check for errors or invalid values in data blocks or individual parameters in the plurality of parameters. However, in one example of the present disclosure, a flagging system may be utilized wherein the parameter flag is limited to a single parameter flag that encompasses at least one error of a plurality of errors that occurs over the plurality of parameters. In this way, even the presence of one error in the parameter values may initialize the parameter flag. By limiting the flagging system to a single flag, less data may be stored in memory and less data may be filtered and processed to find and identify a dedicated address for a specific parameter by the system. This may reduce the computation time for the parameterization process and allow parameterization to occur closer to real-time or near-real time.

Additionally, aspects of the present disclosure may introduce an additional level of error detection by calculating the corresponding CRC for the parameter flag. By including the corresponding CRC value for the parameter flag, systematic or random errors that impact the parameter flag value may be detected, which increases the error detection efficiency of parameters that may introduce degradation effects, increasing vehicle performance overall.

At 208, the method 200 includes writing the parameter value and the CRC value to the dedicated addresses in memory via the ECU in real-time or near real-time. The ECU reads the parameter value for the plurality of parameters sent via the instructions and writes the at least one parameter of the plurality parameters to the dedicated address in memory via the writing mode. Each parameter in the plurality of parameters may have a dedicated address in memory and different parameters may not have the same dedicated address, for example.

A corresponding CRC value for a parameter in the plurality of parameters is calculated based on the parameter value in the plurality of parameters via the calculating mode. After the corresponding CRC value for the parameter in the plurality of parameters is calculated, the CRC value of the parameter is written to a dedicated address via the writing mode of the ECU. The CRC values for the plurality of parameters may be read by the instructions and ECU to detect the presence of valid values or invalid values at various points in time whenever power is supplied to the system. Invalid values may include invalid data types whereas valid values may include valid data types. For example, the parameter value may be a numerical value. However, the calculated CRC value may reference an alpha-numerical value for the parameter value. In this way, the CRC value references an invalid value for the parameter value. Other embodiments may have different criteria for what constitutes invalid data.

The ECU may enter a data maintenance mode in response to detecting invalid values or errors. Additionally, the method 200 may be reinitialized and the parameters with invalid values may be resent to correct the invalid values via instructions (e.g., part of a service tool) in the computing device or the ECU. In some embodiments, all the parameters may be resent to correct the invalid values. By monitoring the parameter values for the plurality of parameters and the corresponding CRC values for the plurality of parameters and detecting invalid values or errors while power is supplied to the system, the frequency of degradation effects of vehicle performance factors may be reduced because degradation problems are resolved as they are introduced into the system.

In an example, the system may respond to each and every occurrence of an error with the parameter values or invalid values by entering an operation mode (e.g., the data maintenance mode) that reduces the degradation effect while the potential degradation effect is in effect rather than operating in the erroneous mode that increases the rate of degradation. In one example, increased performance of the braking system may be maintained by the instructions correcting issues with the brake pedal locations. There may be a desired location for the minimum and maximum position of the brake pedal that increases the lifetime of the brakes in the vehicle. An erroneous value for a parameter of the braking system may cause the brake pedal position to exceed the minimum or maximum position of the brake pedal, resulting in a braking system that functions less efficiently and may degrade the braking system. The data maintenance mode may have a pre-determined set of parameters for the braking system that are more efficient than the erroneous value for the parameter and may minimize damage to the braking system.

At 210, the method 200 includes determining if there are additional parameters that may be sent to memory in the ECU. In one embodiment, a user may interact with a user interface (e.g., the user interface 130 of FIG. 1) and select at least one parameter set of a plurality of parameter sets for the instructions to update via the ECU. The parameter sets may include a pre-determined number of parameters of the plurality of parameters. In another embodiment, a pre-programmed algorithm in the instructions may send parameters in a pre-determined parameter set one by one until there are no remaining parameters in the parameter set. The parameter sets may be for a particular vehicle system or vehicle component, such as the brake system and the like. Other embodiments may organize configuration data in the parameter sets according to methods or organization schemes other than the organization schemes described herein.

If there are additional parameters that may be sent to the ECU, the method 200 continues sending parameters in the plurality of parameters via the instructions, calculating corresponding CRC values for the plurality of parameters via the calculating mode of the ECU, and writing parameter values and the corresponding CRC values for the plurality of parameters to the dedicated addresses in memory via the writing mode of the ECU until no parameters remain or the ECU and/or the instructions encounter an invalid value in real-time or near real-time. If there are no additional parameters that may be sent to the ECU, the method 200 includes reading the parameter values and CRC values via the instructions at 212 in real-time or near real-time. The instructions detect invalid values and valid values. As described above, in the case of invalid values, the ECU enters the data maintenance mode, and the method 200 reinitializes and resends the parameter values for all the parameters in the plurality of parameters or the parameter values of the plurality of parameters with invalid values.

At 214, the method 200 includes comparing read values with expected values via the instructions. In particular, the instructions may compare the read values and expected values for the parameter values for the plurality of parameters and the corresponding CRC values for the plurality of parameters. An at least one read value for the parameter value in the plurality of parameters and the corresponding CRC value for the parameter in the plurality of parameters may be stored in dedicated addresses in memory of the ECU and read from memory via instructions. In contrast, an expected value may be at least one of an initial value of the parameter in the plurality of parameters sent to memory in the ECU via instructions or the corresponding CRC value for the parameter in the plurality of parameters that is calculated based on the initial value of the parameter via instructions. The instructions may utilize an algorithm to calculate the expected values for the corresponding CRC values of the plurality of parameters, which may be the same as the algorithm the ECU uses to calculate the CRC values. As such, the instructions compare the read values and the expected for the parameter values in the plurality of parameters and the corresponding CRC values for the plurality of parameters.

Figure 4:
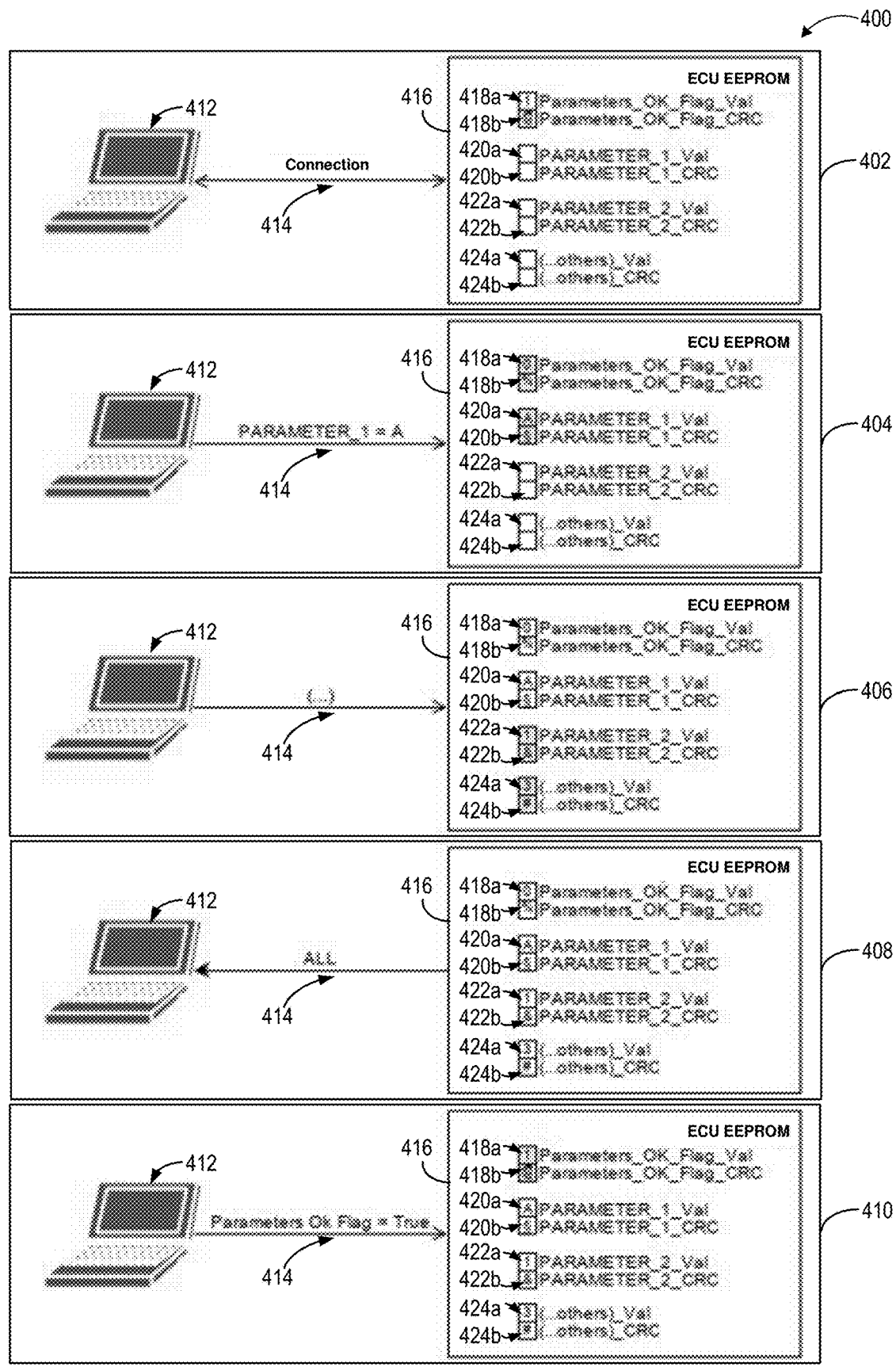
FIG. 4 is a schematic representation of dedicating memory to parameters and corresponding cyclic redundancy check (CRC) values without errors.
Figure 5:
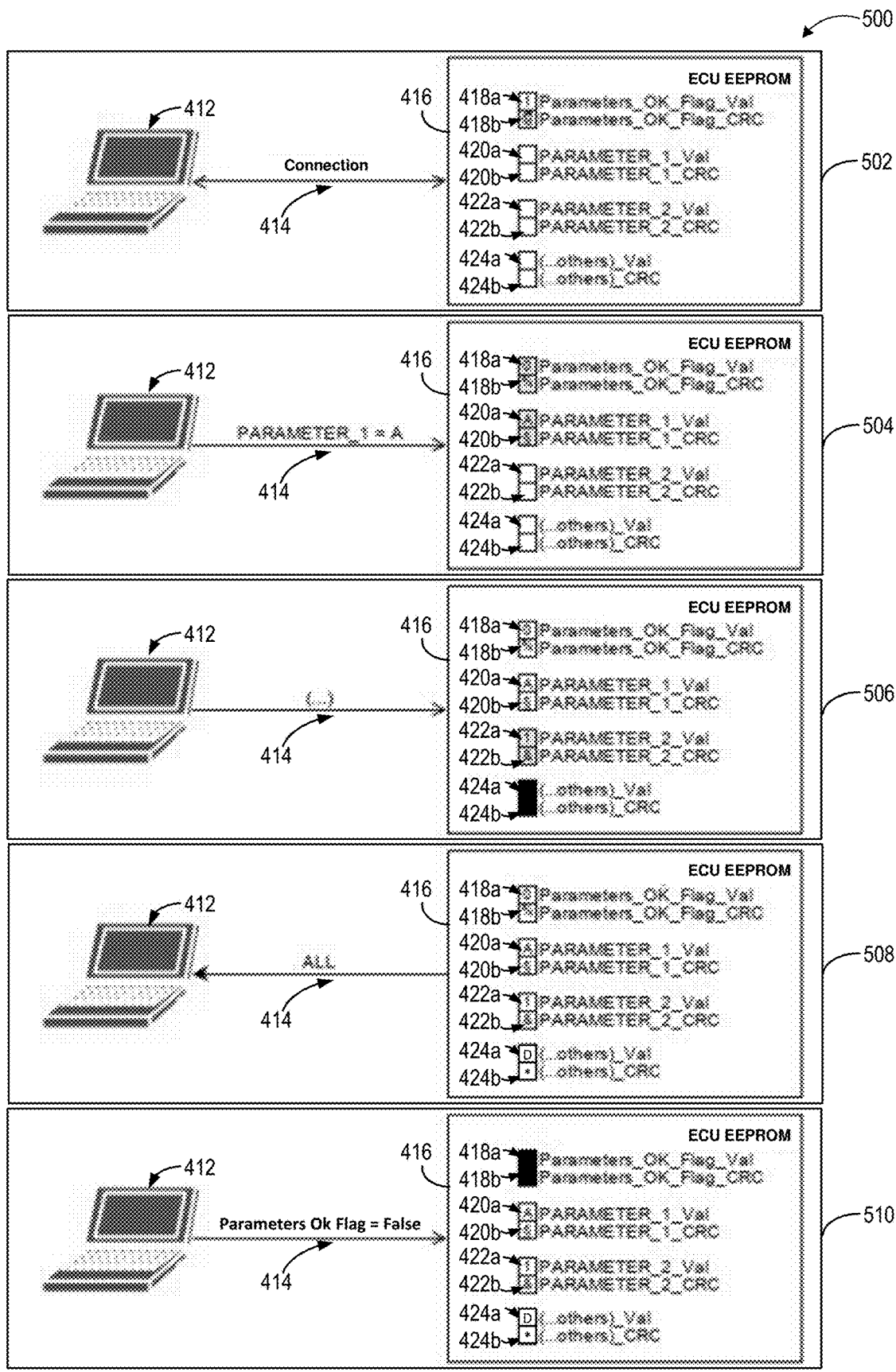
FIG. 5 is a schematic representation of dedicating memory to parameters and corresponding cyclic redundancy check (CRC) values with errors.

In some data storage sequences like the sequence illustrated in FIG. 4, no differences are detected between the read values and the expected values for the plurality of parameters and corresponding CRC values for the plurality of parameters. In other data storage sequences like the sequence illustrated in FIG. 5, differences are detected between the read values and expected values for at least one parameter in the plurality of parameters and/or at least one corresponding CRC value for the parameter in the plurality of parameters. Other systems may utilize various checkpoints (e.g., exceeding two checkpoints) wherein the CRC values for the plurality of parameters are checked for invalid values or errors. The present disclosure limits checkpoints to an initial check when CRC values are calculated via the ECU and a final check prior to termination of the instructions via the instructions. In this way, the method 200 reduces the computation time for the checkpoints while maintaining a similar standard for error detection, allowing the parameterization to occur closer in real-time or near real-time without impacting vehicle performance. As a result of the real-time or near real-time parameterization of the vehicle, the efficiency of the vehicle performance may increase due to optimal parameterization values configuring the vehicle system and components faster.

At 216, the method 200 includes updating the parameter flag based on the results of the comparison of the read values and expected values for the parameter flag and corresponding CRC value of the parameter flag via the instructions. The method 200 further includes performing from among a first data control scheme and a second data control scheme in a plurality of data control schemes in response to the updated parameter flag value. The plurality of data control schemes depends on the parameter flag value. As described above, some embodiments of the present disclosure may utilize the binary flag (e.g. true or false). A true parameter flag value may perform the first data control scheme whereas a false parameter flag value may perform the second data control scheme as illustrated below in FIG. 3. The true parameter flag value may be a first pre-determined value whereas the false parameter flag value may be a second pre-determined value. Other embodiments of the present disclosure may utilize different criteria for implementing the plurality of data control schemes.

At 218, the method 200 includes determining if a parameterization termination condition is satisfied. The instructions may terminate in response to a pre-determined condition being satisfied (e.g., a termination condition) in real-time or near real-time. For example, the termination condition being satisfied may comprise detecting no invalid values or differences between the read values and expected values for the parameter values in the plurality of parameters and the corresponding CRC values for the plurality of parameter. As such, a pre-determined change in the parameter flag value from one value to another value in the dedicated address and a pre-determined change in the corresponding CRC value of the parameter flag from one value to another value in response to detecting no invalid values or differences between read values and expected values may terminate parameterization. In one embodiment, the parameter flag value may change from a value of false to a value of true. As such, the corresponding CRC value of the parameter flag may change from one value to another value as well. The method 200 then ends.

However, if invalid values or differences between the read values and expected values for the parameter values in the plurality of parameters and the corresponding CRC values for the plurality of parameters were encountered during parameterization, the termination condition may be unsatisfied. As such, the instructions may reinitialize the method 200 and resend all the parameter values for the plurality of parameters or a subset of the parameter values in the plurality of parameters (e.g., parameters with invalid values in memory of the ECU) to correct the parameter values of the plurality of parameters and/or the corresponding CRC values of the plurality of parameters. The method 200 proceeds until parameterization is terminated, and the method 200 then ends.

The method 200 described above is illustrative rather than absolute with regards to the scope of the disclosure. In particular, additional monitoring schemes for data monitoring and error detection may be implemented as part of the method 200. For example, the method 200 may include data-block based monitoring in addition to the parameter-based and CRC-based monitoring discussed above. Other embodiments may use alternative monitoring schemes in addition to the parameter-based and CRC-based monitoring discussed above.

An example method 300, as shown in FIG. 3, wherein the process of updating the parameter flag values and performing a first data control scheme or second data control scheme is described. In one embodiment, the method 300 is performed by the in vehicle performance system 100 of FIG. 1. As such, the method 300 is described with respect to the system and components described above with respect to FIG. 1 but may be carried out with other systems/components without departing from the scope of this disclosure. The method 300 and the remaining methods included herein, may be executed by at least one processor (e.g., the processor 128 of FIG. 1) according to instructions in memory (e.g., memory 126 of FIG. 1) of the in vehicle performance system 100 in FIG. 1.

At 302, the method 300 includes writing a parameter flag value to a dedicated address in memory via an electronic control unit (ECU). The parameter flag value for a parameter flag written, via a writing mode of the ECU, is based on the results of a comparison and evaluation of read values and expected values for parameter values for a plurality of parameters. In some examples, the parameter flag value may be binary. As such, the ECU may write a value for the parameter flag of true to the dedicated address in memory in response to detecting no invalid values or differences between read values and expected values for parameter values in a plurality of parameters and corresponding CRC values for the plurality of parameters. Similarly, the ECU may write a value of false to the dedicated address in memory in response to detecting invalid values or differences between read values and expected values for parameter values in a plurality of parameters and corresponding CRC values for the plurality of parameters.

At 304, the method 300 includes writing the CRC value of the parameter flag to a dedicated address in memory via the ECU. The CRC value of the parameter flag is calculated, via the calculating mode of the ECU, based on the parameter flag value for the parameter flag and written, via the writing mode of the ECU, to the dedicated address in memory. In some examples, the parameter flag value may be binary. As such, the corresponding CRC value for the parameter flag may reference a value of true or false for the parameter flag.

At 306, the method 300 includes reading the parameter flag value and CRC value via the instructions. The parameter flag value and CRC value are read via the instructions to determine whether the first data control scheme or the second data control scheme will be implemented based on the values of the parameter flag and CRC value. The first data control scheme may be implemented in response to detecting no invalid values or differences between read values and expected values for parameter values in a plurality of parameters and corresponding CRC values for the plurality of parameters. For example, the read values for the parameter values in a plurality of parameters and the corresponding CRC values for the plurality of parameters in dedicated addresses in memory of the ECU read via instructions matched the expected values. As such, the operating mode of the ECU is maintained and the instructions continue to be executed in the first data control scheme.

In contrast, the second data control scheme may be implemented in response to detecting invalid values or differences between read values and expected values for the parameter values and the corresponding CRC values of the plurality of parameters. In one example, the read values for the parameter values in the plurality of parameters and the corresponding CRC values for the plurality of parameters, read via instructions, in the dedicated addresses in memory of the ECU did not match the expected values, indicating at least one of an invalid value or an error with values stored in the dedicated addresses in memory.

Depending on the parameter flag value, one of the first data control scheme or the second data control scheme is performed by the parameterization process. In one example, the first data control scheme may be implemented if a binary flag is equal to true. In another example, the second data control scheme may be implemented if the binary flag is equal to false. Other embodiments of the present disclosure may utilize other criteria to flag invalid values or errors during parameterization.

The method 300 includes determining if the parameter flag value and CRC value are valid at 308. As described above, invalid values may include data types that are not recognized or accepted for a particular parameter. In some embodiments wherein the binary flag is utilized, valid values for the parameter flag and the corresponding CRC may be indicated by a parameter flag value of true. In this case, the first data control scheme is implemented and a current operating mode of the ECU is maintained. As such, invalid values for the parameter flag and the corresponding CRC may be indicated by a parameter flag value of false. In this case, the second data control scheme is implemented and the operating mode of the ECU is adjusted.

If the parameter flag value and CRC value are invalid, the method 300 includes entering a data maintenance mode via the ECU at 310. The data maintenance mode is entered in response to an invalid parameter flag value of the parameter flag and the corresponding CRC value of the parameter flag. In this case, the second data control scheme is implemented. As described above, the data maintenance mode has pre-determined parameter values that configure the vehicle until invalid values or errors are resolved. As such, the operating state or mode of the ECU is communicated to the instructions in response to a termination condition for parameterization being unsatisfied. The instructions may resend the initial parameter values for the plurality of parameters in response to the ECU entering the data maintenance mode. In this way, the invalid values or errors in the dedicated addresses in memory of the ECU may be corrected. As described herein, at least one of all the parameters may be resent and a subset of the parameters may be resent via the instructions. The method 300 then returns.

If the parameter flag value and CRC value of the parameter flag are valid, the method 300 includes determining if the parameter flag value has a value equal to true via the instructions and/or ECU at 312. As discussed above, the parameter flag may be binary and may have a value of true or false. A true value may indicate that invalid values and no differences were detected when validating the parameter values for the plurality of parameters and the corresponding CRC values for the plurality of parameters between the instructions and the ECU. In this case, the first data control scheme is implemented and the current operating mode of the ECU is maintained. As such, a termination condition for parameterization is satisfied and the ECU communicates to the instructions that the parameterization process is complete. The method 300 then returns.

However, a false value may indicate that invalid values or differences were detected when validating the parameter values and the corresponding CRC values between the instructions and the ECU. In this case, the second data control scheme is implemented wherein the termination condition is unsatisfied and the ECU communicates to the instructions that the parameterization process is not complete. In the second data control scheme, the ECU enters the data maintenance mode with pre-determined parameter values. The instructions may resend the initial parameter values for the plurality of parameters in response to the ECU entering the data maintenance mode. In this way, the invalid values or errors in the dedicated addresses in memory of the ECU may be corrected. As described herein, at least one of all the parameters may be resent and a subset of the parameters may be resent via the instructions. The method 300 then returns.

Parameterization of the in vehicle performance system 100 of FIG. 1 is performed by the method 200 of FIG. 2 and the method 300 of FIG. 3. In particular, the method 200 of FIG. 2 executes instructions for data monitoring and error detection. The method 300 performs one of the first data control scheme and the second data control scheme in response to the monitoring result from the data monitoring and error detection algorithm of FIG. 2. The first data control scheme is implemented in response to the monitoring result wherein no invalid values or errors were detected, including differences between the read values and expected values for the parameter values for the plurality of parameters and corresponding CRC values for the plurality of parameters. An example of the first data control scheme is illustrated in FIG. 4. In contrast, the second data control scheme is implemented in response to a monitoring result wherein invalid values or errors were detected, including differences between the read values and expected values for the parameter values for the plurality of parameters and corresponding CRC values for the plurality of parameters. An example of the second data control scheme is illustrated in FIG. 5.

FIGS. 4 and 5 show example storage sequences that describes the storage of parameter values for a plurality of parameters in a plurality of addresses in non-volatile memory of an ECU via instructions. In particular, FIG. 4 describes storage of parameter values for the plurality of parameters in memory wherein no invalid values and errors are detected, including differences between read values and expected values for parameter values for the plurality of parameters and corresponding CRC values for the plurality of parameters. In contrast, FIG. 5 describes the storage of storage of parameter values for the plurality of parameters in memory wherein invalid values and errors are detected, including differences between read values and expected values for parameter values for the plurality of parameters and corresponding CRC values for the plurality of parameters.

The storage sequence 400 in FIG. 4 and the storage sequence 500 in FIG. 5 include a computer 412 that executes data monitoring and error detection instructions (e.g., a service tool for a vehicle), a memory 416 that stores parameter values for a plurality of parameters (e.g., a plurality of operating parameters of the vehicle), corresponding cyclic redundancy check (CRC) values for the plurality of parameters, a parameter flag value for a parameter flag that alerts the system when invalid values and errors are detected, and a corresponding CRC value for the parameter flag, and a communication channel 414 between the computer 412 and the memory 416.

In one embodiment, the memory 416 may be non-volatile (e.g. electrically erasable programmable read-only memory (EEPROM)). Other embodiments may use alternate types of non-volatile memory. The memory 416 includes a first dedicated address 418a, a second dedicated address 418b, a third dedicated address 420a, a fourth dedicated address 420b, a fifth dedicated address 422a, a sixth dedicated address 422b, a seventh dedicated address 424a, and an eighth dedicated address 424b. The first dedicated address 418a and the second dedicated address 418b may store the parameter flag value for the parameter flag and the corresponding CRC value of the parameter flag. The third dedicated address 420a and the fourth dedicated address 420b may store a first parameter value of a first parameter in the plurality of parameters and a corresponding CRC value for the first parameter.

The fifth dedicated address 422a and the sixth dedicated address 422b may store a second parameter value of a second parameter and a corresponding CRC value for the second parameter. The seventh dedicated address 424a and the eighth dedicated address 424b may store a third parameter value for a third parameter and a corresponding CRC value for the third parameter. It may be understood that an arrangement of the dedicated addresses of the plurality of addresses in memory 416 described above are illustrative rather than absolute. Other embodiments may utilize different locations in memory for different parameters in the plurality of parameters and the corresponding CRC values of the plurality of parameters. Some embodiments may include a greater number of addresses in memory to store the plurality of parameters. Additionally, in another embodiment of the present disclosure, the plurality of parameters may include a greater number of parameters.

At 402, the storage sequence 400 includes the computer 412 connecting with memory 416 and transmitting a command or message via the communication channel 414 via instructions in real-time or near real-time. The command or message sent by the computer 412 initializes the parameterization process and a system such as an electronic control unit (ECU) responds to an initialization condition. In one embodiment, the initialization condition may include the computer 412 sending the first parameter to the third dedicated address 420a in the memory. The ECU may update the parameter flag value for the parameter flag in the first dedicated address 418a in response, enabling the instructions to execute a pre-programmed algorithm. In particular, the instructions may be executed in response to a pre-determined change in the parameter flag value from one value to another value. As one example, for a binary flag, the parameter flag value for the parameter flag may change from a value of true (e.g., the parameter flag value equals one) to a value of false (e.g. parameter flag equals zero). In other embodiments of the present disclosure, other pre-determined changes may initialize the parameterization process. The example above is illustrative rather than absolute.

At 404, the storage sequence 400 includes updating the parameter flag value for the parameter flag in the first dedicated address 418a and the corresponding CRC value for the parameter flag in the second dedicated address 418b via the ECU via a writing mode to initialize parameterization in real-time or near real-time. For example, the parameter flag value for primary flag in the first dedicated address 418a may change from a value of one to zero, and the parameter flag CRC value in the second dedicated address 418b may change from an ampersand symbol to a percent symbol. In this way, the initialization condition to execute instructions is satisfied by the pre-determined change in value of the parameter flag and the corresponding CRC value for the parameter flag. As such, the computer 412 sends the first parameter to the third dedicated address 420a and writes the first parameter value (e.g., capital letter A) for the first parameter in memory of the ECU via the writing mode in real-time or near real-time. The corresponding CRC value of the first parameter is calculated via a calculating mode of the ECU and stored in the fourth dedicated address 420b (e.g., §) in memory of the ECU in real-time or near real-time. The computer 412 proceeds to execute the instructions for the remaining parameters in the plurality of parameters.

At 406, the storage sequence 400 includes sending the second parameter to the fifth dedicated address 422a via instructions executed in the computer 412, writing the second parameter value (e.g. 1) for the second parameter in the fifth dedicated address 422a via the writing mode of the ECU, calculating the corresponding CRC value (e.g., &) of the second parameter via the calculating mode of the ECU, and storing the CRC value of the second parameter in the sixth dedicated address 422b in real-time or near real-time.

Additionally, the computer 412 sends the third parameter to the seventh dedicated address 424a via instructions, and the ECU writes the second parameter value for the second parameter (e.g. 3) in the seventh dedicated address 424a via the writing mode, and the corresponding CRC value (e.g., #) is calculated via the calculating mode and stored in the eighth dedicated address 424b in real-time or near real-time. It may be understood that in some embodiments of the disclosure that not all the parameters in the plurality of parameters may be written in memory 416 of the ECU. Instead, a subset of the plurality of parameters may be written in memory 416 via the ECU.

At 408, the storage sequence 400 includes reading all the parameter values for all the parameters in the plurality of parameters and the corresponding CRC values for the plurality of parameters via instructions executed in the computer 412 in real-time or near real-time. To reduce the frequency of errors and invalid values, all the parameter values for the plurality of parameters that have been written via the writing mode in the memory 416 of the ECU are read and checked for invalid values or errors. Since the corresponding CRC values in the present example are considered valid, the computer 412 validates the parameter values for the plurality of parameters and the corresponding CRC values of the plurality of parameters via instructions.

As such, at 410, the storage sequence 400 includes comparing the read values and expected values for the parameter values in the plurality of parameters and the corresponding CRC values of the plurality of parameters via instructions executed in the computer 412 in real-time or near real-time. No differences are detected between the read values and expected values. The read values for the parameter values in the plurality of parameters and the corresponding CRC values for the plurality of parameters matched the expected values. Accordingly, the computer 412 implements a first data control scheme and maintains the operating mode of the ECU in response to detecting no invalid values or errors, including no differences between the read values and the expected values. As such, the parameter flag value for the parameter flag in the first dedicated address 418a is updated and the corresponding CRC value for the parameter flag is calculated via the calculating mode and updated in the second dedicated address 418b via the writing mode in real-time or near real-time.

The updates to the parameter flag value for the parameter flag in the first dedicated address 418a and the corresponding CRC value for the parameter flag in the second dedicated address 418b satisfies a pre-determined condition or a termination condition. As such, the pre-programmed algorithm terminates and the instructions ceases to execute in response to the termination condition being satisfied. In the present example, the termination condition occurs when the parameter flag value for the parameter flag changes from false to true (e.g., from 0 to 1) and the corresponding CRC value for the parameter flag is recalculated and validated at the recalculated value to detect errors or invalid values.

As illustrated in FIG. 5, an example storage sequence 500 demonstrates the storage of the same parameters in the plurality of parameters of FIG. 4 wherein invalid values and errors are detected via instructions. At 502, the storage sequence 500 includes the computer 412 connecting with memory 416 and transmitting a command or message via the communication channel 414 via instructions in real-time or near real-time. As described above in FIG. 4, in one embodiment, an initialization condition may include the computer 412 sending a first parameter in the plurality of parameters to the memory 416, initializing the parameterization process.

As such, the ECU may update the parameter flag value for the parameter flag in the first dedicated address 418a in memory 416 in response to the initialization condition being satisfied, which may enable the instructions to run a pre-programmed algorithm. In one example, as shown in the first dedicated address 418a, the instructions may be executed in response to a pre-determined change in the parameter flag value for the parameter flag from one value to another. As described above, the pre-determined change for the binary flag may comprise the parameter flag value changing from the value of true to the value of false. Other embodiments may utilize other pre-determined changes to initialize the parameterization process.

At 504, the storage sequence 500, includes updating the parameter flag value of the parameter flag in the first dedicated address 418a and the corresponding CRC value for the parameter flag in the second dedicated address 418b via the ECU via a writing mode to initialize parameterization in real-time or near real-time. As such, the parameter flag value for the parameter flag in the first dedicated address 418a changes from true to false (e.g., from one to zero) and the parameter flag CRC value in the second dedicated address 418b changes as well (e.g. from & to %). In this way, the initialization condition to execute the instructions is satisfied. In response to the initialization condition being satisfied, the computer 412 sends the first parameter to the third dedicated address 420a and the first parameter value is written to the third dedicated address 420a via the ECU via the writing mode. The corresponding CRC value of the first parameter is calculated via a calculating mode and stored in the fourth dedicated address 420b.

At 506, the storage sequence 500 includes sending the second parameter to the fifth dedicated address 422a via instructions executed in the computer 412, writing the second parameter value for the second parameter in the fifth dedicated address 422a via the writing mode, calculating the corresponding CRC value of the second parameter via the calculating mode, and storing the CRC value of the second parameter in the sixth dedicated address 422b in memory 416 of the ECU in real-time or near real-time. Additionally, the computer 412 sends the third parameter to the seventh dedicated address 424a via instructions in real-time or near real-time. The ECU writes the second parameter value (e.g., D) in the seventh dedicated address via the writing mode and the corresponding CRC value (e.g., *) for the second parameter is calculated via the calculating mode and stored in the eighth dedicated address 424b in real-time or near real-time. It may be understood that in some embodiments of the disclosure that not all the parameters in the plurality of parameters may be written in memory 416 of the ECU. Instead, a subset of the plurality of parameters may be written in memory 416 via the ECU.

At 508, the storage sequence 500 includes reading all parameter values for all parameters in the plurality of parameters and the corresponding CRC values for the plurality of parameters via instructions executed in the computer 412 in real-time or near real-time. To reduce the frequency of errors and invalid values, all parameters values for the plurality of parameters that have been written via the writing mode in the memory 416 of the ECU are read and checked for invalid values or errors. As mentioned above, the parameters values for the plurality of parameters in the memory 416 in the storage sequence 500 are the same parameters in the storage sequence 400 in FIG. 4. When comparing the third parameter of the storage sequence 400 and the storage sequence 500, the parameter value for the third parameter in the seventh dedicated address 424a has changed from a value of 3 to a value of D. Similarly, the corresponding CRC value for the third parameter in the eighth dedicated address 424b has changed from an ampersand symbol to an asterisk symbol.

In some embodiments of the present disclosure, the corresponding CRC value for the third parameter stored in the eighth dedicated address 424b may be considered an invalid value as a result of the change in value of the parameter value of the third parameter. In response to the invalid CRC value, a second data control scheme maybe implemented wherein the second data control scheme comprises entering a data maintenance mode via the ECU according to the methods illustrated in FIGS. 2 and 3 and resending at least one of all the parameters in the plurality of parameters and a subset of the plurality of parameters to correct invalid values and errors. In other embodiments, the corresponding CRC value for the third parameter stored in the eighth dedicated address 424b may be different from the value previously calculated in the storage sequence 400, but may still be considered valid. In this case, the second data control scheme is not implemented and the first data control scheme is implemented, wherein the operating mode of the ECU is maintained.

As such, at 510, the storage sequence 500 includes comparing the read values and expected values for the parameter values in the plurality of parameters and the corresponding CRC values of the plurality of parameters via instructions executed in the computer 412 in real-time or near real-time. In the case described above wherein the third parameter value in the seventh dedicated address 424a is valid but different from the third parameter value in the storage sequence 400 of FIG. 4, the instructions may detect differences between the read values and the expected values for the parameter values of the plurality of parameters (e.g., 3 and D) and the corresponding CRC values for the plurality of parameters (e.g., # and *).

A monitoring result in which differences were detected may indicate that an error occurred when the parameter value for the third parameter was transmitted or written as the read values and expected values do not match. Accordingly, the second data control scheme may be implemented. As a result, the parameter flag value for the parameter flag would not be updated in the first dedicated address 418a, and the corresponding CRC value of the parameter flag would not be recalculated via the calculating mode and stored in the second dedicated address 418b via the writing mode. Instead, the ECU may enter the data maintenance mode and resend the parameter values for the plurality of parameters according to the methods described in FIGS. 2 and 3 in response to the termination condition being unsatisfied due to the parameter flag value for the parameter flag and the corresponding CRC of the parameter flag not being updated.

The technical effect of parameterizing a vehicle to reduce degradation effects of vehicle performance based on storing parameter values and cyclic redundancy check (CRC) values of the parameters in dedicated addresses in memory and indicating the presence of errors or invalid data with a parameter flag and a CRC of the parameter flag is that data monitoring and processing may occur in real-time or near-real time due to a reduction in the amount of allocated memory for the parameterization process.

The disclosure also provides support for a method for a vehicle, comprising: sending a first parameter of a plurality of parameters to a third dedicated address of a plurality of addresses in memory, updating a parameter flag value for a parameter flag in a first dedicated address of the plurality of addresses in memory, updating a cyclic redundancy check (CRC) value for the parameter flag in a second dedicated address of the plurality of addresses in memory, writing a first parameter value for the first parameter in the third dedicated address and updating a CRC value of the first parameter to a fourth dedicated address of the plurality of addresses in memory, sending a second parameter of the plurality of parameters to a fifth dedicated address of the plurality of addresses in memory, writing a second parameter value for the second parameter in the fifth dedicated address and updating a CRC value of the second parameter in a sixth dedicated address, and identifying a monitoring result between read values in dedicated addresses in memory for the plurality of parameters and corresponding CRC values for the plurality of parameters, and expected values for the plurality of parameters and corresponding CRC values for the plurality of parameters that are determined based on parameter values of the plurality of parameters sent to dedicated addresses in memory.

In a first example of the method, the first parameter of the plurality of parameters is a first operating parameter of a plurality of operating parameters of the vehicle and the second parameter of the plurality of parameters is a second operating parameter of the plurality of operating parameters of the vehicle. In a second example of the method, optionally including the first example, the parameter flag is used for one or more of the following: satisfy an initialization condition to initialize instructions, enter a writing mode of an electronic control unit (ECU) of the vehicle that writes the parameter flag value, the cyclic redundancy check (CRC) value of the parameter flag, parameter values, and CRC values of the parameter values to dedicated addresses of the plurality of addresses in memory, enter a calculating mode of the ECU of the vehicle that calculates cyclic redundancy check (CRC) values for the parameter flag and the plurality of parameters, identify errors and invalid data, and terminate instructions.

In a third example of the method, optionally including one or both of the first and second examples, identifying the monitoring result between read values in dedicated addresses in memory for the plurality of parameters and corresponding CRC values for the plurality of parameters, and expected values for the plurality of parameters and corresponding CRC values for the plurality of parameters that are determined based on parameter values for the plurality of parameters sent to dedicated addresses in memory comprises: updating the parameter flag in the first dedicated address of the plurality of addresses via instructions, writing the parameter flag value in the first dedicated address of the plurality of addresses via an ECU via a writing mode, updating the CRC value of the parameter flag in the second dedicated address of the plurality of addresses via the ECU by recalculating the CRC value of the parameter flag via a calculating mode, writing the CRC value of the parameter flag in the second dedicated address of the plurality of addresses via the ECU via the writing mode, and implementing from among a first data control scheme and a second data control scheme in a plurality of data control schemes in response to the monitoring result between a read value and an expected value for the plurality of parameters and the corresponding CRC values for the plurality of parameters.

In a fourth example of the method, optionally including one or more or each of the first through third examples, implementing from among the first data control scheme and the second data control scheme in a plurality of data control schemes in response to the monitoring result between the read value and the expected value for the plurality of parameters and the corresponding CRC values for the plurality of parameters. comprises: reading all parameter values for the plurality of parameters stored in memory of the ECU via instructions, comparing read values and expected values of all parameters via instructions, reading CRC values for the plurality of parameters stored in memory of the ECU via instructions, calculating CRC values for the plurality of parameters sent via the instructions to determine expected values for the CRC values, comparing read values and the expected values for the plurality of parameters and the corresponding CRC values for the plurality of parameters, and performing the first data control scheme in response to detecting no invalid values and differences between the read values and expected values for the plurality of parameters and the corresponding CRC values for the plurality of parameters, and the second data control scheme in response to detecting invalid values and differences between read values and expected values for the plurality of parameters and the corresponding CRC values and valid data for the parameter values and corresponding CRC values. In a fifth example of the method, optionally including one or more or each of the first through fourth examples, the method occurs in real-time or near real-time.

The disclosure also provides support for a method for a vehicle, comprising: sending a first parameter of a plurality of parameters to a third dedicated address of a plurality of addresses in memory via instructions, updating a parameter flag value of a parameter flag in a first dedicated address of the plurality of addresses in memory via an electronic control unit (ECU) in the vehicle, updating a cyclic redundancy check (CRC) value for the first parameter in a second dedicated address of the plurality of addresses in memory via the ECU, writing a first parameter value for the first parameter in the third dedicated address in memory and a CRC value of the first parameter in a fourth dedicated address in memory via the ECU, sending remaining parameters in the plurality of parameters to dedicated addresses in memory via instructions, writing remaining parameter values and CRC values of the plurality of parameters to dedicated addresses in memory via the ECU, reading parameter values and CRC values for the plurality of parameters in dedicated addresses in memory of the ECU via instructions, comparing read values with expected values for the plurality of parameters and corresponding CRC values for the plurality of parameters in dedicated addresses in memory via instructions, evaluating read values and expected values for the plurality of parameters and corresponding CRC values for the plurality of parameters to detect differences between read values and expected values, and implementing from among a first data control scheme and a second data control scheme in response to a comparison and evaluation of the read values and expected values for the plurality of parameters and corresponding CRC values for the plurality of parameters.

In a first example of the method, instructions are stored and executed in memory of a computing device or in memory of the ECU. In a second example of the method, optionally including the first example, an initialization condition for instructions includes sending the first parameter of the plurality of parameters to the third dedicated address of the plurality of addresses in memory. In a third example of the method, optionally including one or both of the first and second examples, the dedicated addresses are stored in memory of the ECU and dedicated addresses for the parameter flag, the CRC value of the parameter flag, parameter values for the plurality of parameters, and corresponding CRC values of the plurality of parameters are separate, distinct, and stored in different locations in memory of the ECU. In a fourth example of the method, optionally including one or more or each of the first through third examples, the parameter flag is a binary flag. In a fifth example of the method, optionally including one or more or each of the first through fourth examples implementing from among the first data control scheme and the second data control scheme in response to the comparison and evaluation of the read values and expected values for the plurality of parameters and corresponding CRC values for the plurality of parameters: setting the parameter flag to a first pre-determined value in response to detecting invalid values and no differences between read values and expected values for the plurality of parameters and corresponding CRC values for the plurality of parameters or a second pre-determined value in response to detecting invalid values and differences between read values and expected values for plurality of parameters and corresponding CRC values for the plurality of parameters, writing the parameter flag value and updating the CRC value of the parameter flag to dedicated addresses in memory of the ECU, evaluating the parameter flag value and CRC value of the parameter flag to detect errors and/or invalid values via instructions, entering a data maintenance mode with pre-determined parameter values in response to detecting errors and/or invalid values via the ECU, determining whether a termination condition for instructions is satisfied, resending the parameter values in response to detecting errors and/or invalid values and/or the termination condition that is unsatisfied via instructions, and terminating the instructions in response to a satisfied termination condition.

In a sixth example of the method, optionally including one or more or each of the first through fifth examples, at least one error in a plurality of errors includes comparing the read values with the expected values for the plurality of parameters and the corresponding CRC values for the plurality of parameters via instructions, and at least one read value and expected value do not match. In a seventh example of the method, optionally including one or more or each of the first through sixth examples, a read value comprises a parameter value of a parameter and/or CRC value of the parameter read in a dedicated address in memory of the ECU via instructions and an expected value comprises at least one of an initial parameter value sent to the dedicated address in memory of the ECU via the instructions or CRC value based on the initial parameter value calculated via the instructions. In an eighth example of the method, optionally including one or more or each of the first through seventh examples, the data maintenance mode includes setting the plurality of parameters to pre-determined parameter values in response to detecting errors or invalid values in memory of the ECU and maintaining the pre-determined parameter values as the errors or invalid values are resolved.

The disclosure also provides support for a system, comprising: a vehicle with various systems and components such as an electronic control unit (ECU) communicatively coupled to controller(s) that configure sensors and actuators, the ECU that comprises at least one processor and one memory of a plurality of memories with dedicated addresses of a plurality of addresses for a parameter flag, a corresponding CRC value for the parameter flag, parameter values for a plurality of parameters, and corresponding CRC values for the plurality of parameters, and a computing device that comprises a user interface and a processor operatively coupled to the user interface and executable instructions in at least one memory, that when executed, cause the processor to: execute a service tool comprising instructions and pre-programmed algorithms that connects to the ECU for parameterization, send parameters to dedicated addresses in memory that configure the various systems and components of the vehicle to the ECU, read a parameter flag value of the parameter flag and the corresponding CRC value of the parameter flag in dedicated addresses in memory of the ECU, read parameter values of the plurality of parameters and corresponding CRC values of the plurality of parameters in dedicated addresses in memory of the ECU, calculate CRC values for the plurality of parameters based on parameter values of the plurality of parameters sent to the ECU, compare read values of parameter values for the plurality of parameters with expected values of initial parameter values sent to the ECU via instructions, compare corresponding CRC values for the plurality of parameters from memory of the ECU with expected values of the CRC values that are calculated via instructions based on initial parameter values for the plurality of parameters, and detect invalid values and differences between the read values and the expected for the parameter flag value of the parameter flag, the corresponding CRC value of the parameter flag, parameter values for the plurality of parameters, and the corresponding CRC values of the plurality of parameters.

In a first example of the system, the dedicated addresses in memory of the ECU that store the parameter flag value for the parameter flag, corresponding CRC value of the parameter flag, the parameter values for the plurality of parameters, and the corresponding CRC values of the plurality of parameters have separate, distinct, and different locations in memory, and parameter values of the plurality of parameters stored in dedicated addresses in memory of the ECU may configure the various systems and components of the vehicle, such as actuators and sensors, via the controller. In a second example of the system, optionally including the first example, the ECU accesses the dedicated addresses in memory to: read the parameter flag value of the parameter flag and the corresponding CRC value of the parameter flag, write the parameter flag value of the parameter flag and the corresponding CRC value of the parameter flag, read parameter values of the plurality of parameters and corresponding CRC values of the plurality of parameters, write parameter values of the plurality of parameters and corresponding CRC values of the plurality of parameters, calculate the corresponding CRC value for the parameter flag based on the parameter flag value, calculate CRC values for the plurality of parameters based on parameter values for the plurality of parameters, detect invalid values, differences between the corresponding CRC value of the parameter flag and a recalculated value for the parameter flag based on the parameter flag, differences between the corresponding CRC values of the plurality of parameters and the recalculated value for the corresponding CRC values of the plurality of parameters based on the parameter values.

In a third example of the system, optionally including one or both of the first and second examples, the ECU operates in a calculating mode to calculate or recalculate the corresponding CRC value for the parameter flag and the plurality of parameters via instructions stored in the plurality of memories of the ECU, and the ECU operates in a writing mode to write the parameter flag value for the parameter flag, the corresponding CRC value for the parameter flag, parameter values for the plurality of parameters, and the corresponding CRC values for the plurality of parameters to dedicated addresses in memory via instructions stored in the plurality of memories of the ECU.

In a fourth example of the system, optionally including one or more or each of the first through third examples, detecting invalid values, differences between the corresponding CRC value of the parameter flag and the recalculated value for the parameter flag based on the parameter flag, differences between the corresponding CRC values of the plurality of parameters and the recalculated value for the corresponding CRC values of the plurality of parameters based on the parameter values: implementing a first data control scheme in response to detecting no invalid values and no differences between read values and expected values for the parameter flag value of the parameter flag, the corresponding CRC value of the parameter flag, and parameter values of the plurality of parameters, and the corresponding CRC values of the plurality of parameters comprises: setting the parameter flag value to a first pre-determined value via instructions of the service tool stored in the computing device, writing the parameter flag value of the parameter flag via a writing mode and updating the corresponding CRC value of the parameter flag to an at least one memory of the ECU via a calculating mode and the writing mode, comparing and evaluating the parameter flag value of the parameter flag and the corresponding CRC value of the parameter flag via instructions of the service tool stored in the computing device, and terminating instructions of the service tool in the computing device in response to a termination condition being satisfied, and implementing a second data control scheme in response to detecting invalid values and no differences between read values and expected values for the parameter flag value of the parameter flag, the corresponding CRC value of the parameter flag, and parameter values of the plurality of parameters, and the corresponding CRC values of the plurality of parameters comprises: setting the parameter flag value to a second pre-determined value via instructions of the service tool stored in the computing device, writing the parameter flag value of the parameter flag via the writing mode and updating the corresponding CRC value of the parameter flag to the at least one memory of the ECU via the calculating mode and the writing mode, comparing and evaluating the parameter flag value of the parameter flag and the corresponding CRC value of the parameter flag via instructions of the service tool stored in the computing device, entering a data maintenance mode with pre-determined parameter values via the ECU, and resending the parameter values for the plurality of parameters and the corresponding CRC values for the plurality of parameters in response to the termination condition being unsatisfied.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

As used herein, the terms "approximately" and "substantially" are construed to mean plus or minus five percent of the range, unless otherwise specified.

The invention claimed is:

1. A method for a vehicle, comprising:
sending a first parameter of a plurality of parameters to a third dedicated address of a plurality of addresses in memory;
updating a parameter flag value for a parameter flag in a first dedicated address of the plurality of addresses in memory;
updating a cyclic redundancy check (CRC) value for the parameter flag in a second dedicated address of the plurality of addresses in memory;
writing a first parameter value for the first parameter in the third dedicated address and updating a CRC value of the first parameter to a fourth dedicated address of the plurality of addresses in memory;
sending a second parameter of the plurality of parameters to a fifth dedicated address of the plurality of addresses in memory;
writing a second parameter value for the second parameter in the fifth dedicated address and updating a CRC value of the second parameter in a sixth dedicated address; and
identifying a monitoring result between read values in dedicated addresses in memory for the plurality of parameters and corresponding CRC values for the plurality of parameters, and expected values for the plurality of parameters and corresponding CRC values for the plurality of parameters that are determined based on parameter values of the plurality of parameters sent to dedicated addresses in memory.

2. The method of claim 1, wherein the first parameter of the plurality of parameters is a first operating parameter of a plurality of operating parameters of the vehicle and the second parameter of the plurality of parameters is a second operating parameter of the plurality of operating parameters of the vehicle.

3. The method of claim 1, wherein the parameter flag is used for one or more of the following: satisfy an initialization condition to initialize instructions, enter a writing mode of an electronic control unit (ECU) of the vehicle that writes the parameter flag value, the cyclic redundancy check (CRC) value of the parameter flag, parameter values, and CRC values of the parameter values to dedicated addresses of the plurality of addresses in memory, enter a calculating mode of the ECU of the vehicle that calculates cyclic redundancy check (CRC) values for the parameter flag and the plurality of parameters, identify errors and invalid data, and terminate instructions.

4. The method of claim 1, wherein identifying the monitoring result between read values in dedicated addresses in memory for the plurality of parameters and corresponding CRC values for the plurality of parameters, and expected values for the plurality of parameters and corresponding CRC values for the plurality of parameters that are determined based on parameter values for the plurality of parameters sent to dedicated addresses in memory comprises:
updating the parameter flag in the first dedicated address of the plurality of addresses via instructions;
writing the parameter flag value in the first dedicated address of the plurality of addresses via an ECU via a writing mode;
updating the CRC value of the parameter flag in the second dedicated address of the plurality of addresses via the ECU by recalculating the CRC value of the parameter flag via a calculating mode;
writing the CRC value of the parameter flag in the second dedicated address of the plurality of addresses via the ECU via the writing mode; and
implementing from among a first data control scheme and a second data control scheme in a plurality of data control schemes in response to the monitoring result between a read value and an expected value for the plurality of parameters and the corresponding CRC values for the plurality of parameters.

5. The method of claim 4, wherein implementing from among the first data control scheme and the second data control scheme in a plurality of data control schemes in response to the monitoring result between the read value and the expected value for the plurality of parameters and the corresponding CRC values for the plurality of parameters, comprises:
reading all parameter values for the plurality of parameters stored in memory of the ECU via instructions;
comparing read values and expected values of all parameters via instructions;

reading CRC values for the plurality of parameters stored in memory of the ECU via instructions;

calculating CRC values for the plurality of parameters sent via the instructions to determine expected values for the CRC values;

comparing read values with both the expected values for the plurality of parameters and the corresponding CRC values for the plurality of parameters; and performing the first data control scheme in response to detecting no invalid values and differences between the read values and expected values for the plurality of parameters and the corresponding CRC values for the plurality of parameters, and the second data control scheme in response to detecting invalid values and differences between read values and expected values for the plurality of parameters and the corresponding CRC values and valid data for the parameter values and corresponding CRC values.

6. The method of claim 1, wherein the method occurs in real-time or near real-time.

7. A method for a vehicle, comprising:

sending a first parameter of a plurality of parameters to a third dedicated address of a plurality of addresses in memory via instructions;

updating a parameter flag value of a parameter flag in a first dedicated address of the plurality of addresses in memory via an electronic control unit (ECU) in the vehicle;

updating a cyclic redundancy check (CRC) value for the first parameter in a second dedicated address of the plurality of addresses in memory via the ECU;

writing a first parameter value for the first parameter in the third dedicated address in memory and a CRC value of the first parameter in a fourth dedicated address in memory via the ECU;

sending remaining parameters in the plurality of parameters to dedicated addresses in memory via instructions;

writing remaining parameter values and CRC values of the plurality of parameters to dedicated addresses in memory via the ECU;

reading parameter values and CRC values for the plurality of parameters in dedicated addresses in memory of the ECU via instructions;

comparing read values with expected values for the plurality of parameters and corresponding CRC values for the plurality of parameters in dedicated addresses in memory via instructions;

evaluating the read values and the expected values for the plurality of parameters and corresponding CRC values for the plurality of parameters to detect differences between the read values and the expected values; and implementing from among a first data control scheme and a second data control scheme in response to a comparison and evaluation of the read values and the expected values for the plurality of parameters and corresponding CRC values for the plurality of parameters.

8. The method of claim 7, wherein instructions are stored and executed in memory of a computing device or in memory of the ECU.

9. The method of claim 7, wherein an initialization condition for instructions includes sending the first parameter of the plurality of parameters to the third dedicated address of the plurality of addresses in memory.

10. The method of claim 7, wherein the dedicated addresses are stored in memory of the ECU and dedicated addresses for the parameter flag, the CRC value of the parameter flag, parameter values for the plurality of parameters, and corresponding CRC values of the plurality of parameters are separate, distinct, and stored in different locations in memory of the ECU.

11. The method of claim 7, wherein the parameter flag is a binary flag.

12. The method of claim 7, wherein implementing from among the first data control scheme and the second data control scheme in response to the comparison and evaluation of the read values and expected values for the plurality of parameters and corresponding CRC values for the plurality of parameters, comprises:

setting the parameter flag to a first pre-determined value in response to detecting invalid values and no differences between read values and expected values for the plurality of parameters and corresponding CRC values for the plurality of parameters or a second pre-determined value in response to detecting invalid values and differences between read values and expected values for plurality of parameters and corresponding CRC values for the plurality of parameters;

writing the parameter flag value and updating the CRC value of the parameter flag to dedicated addresses in memory of the ECU;

evaluating the parameter flag value and the updated CRC value of the parameter flag to detect errors and/or invalid values via instructions;

entering a data maintenance mode with pre-determined parameter values in response to detecting errors and/or invalid values via the ECU;

determining whether a termination condition for instructions is satisfied;

resending the parameter values in response to detecting errors and/or invalid values and/or the termination condition that is unsatisfied via instructions; and terminating the instructions in response to a satisfied termination condition.

13. The method of claim 12, wherein at least one error of the errors is determined by comparing the read values with corresponding expected values of the expected values for the plurality of parameters, and comparing the read values with the corresponding CRC values for the plurality of parameters via instructions, and determining at least one read value of the read values and a corresponding expected value of the corresponding expected values do not match.

14. The method of claim 12, wherein a read value comprises a parameter value of a parameter and/or CRC value of the parameter read in a dedicated address in memory of the ECU via instructions and an expected value comprises at least one of an initial parameter value sent to the dedicated address in memory of the ECU via the instructions or CRC value based on the initial parameter value calculated via the instructions.

15. The method of claim 12, wherein the data maintenance mode includes setting the plurality of parameters to pre-determined parameter values in response to detecting errors or invalid values in memory of the ECU and maintaining the pre-determined parameter values as the errors or invalid values are resolved.

16. A system, comprising:

a vehicle comprising various systems and components including an electronic control unit (ECU) communicatively coupled to one or more controllers that configure sensors and actuators;

the ECU that comprises at least one processor and one memory of a plurality of memories with dedicated addresses of a plurality of addresses for a parameter flag, a corresponding CRC value for the parameter flag; parameter values for a plurality of parameters, and corresponding CRC values for the plurality of parameters, and wherein configuring the sensors and actuators incudes updating the parameter values for the plurality of parameters associated with vehicle performance to control the sensors and actuators; and a computing device that comprises a user interface and a processor operatively coupled to the user interface and executable instructions in at least one memory, that when executed, cause the processor to:
  execute a service tool comprising instructions and pre-programmed algorithms that connects to the ECU for parameterization;
  send parameters to dedicated addresses in memory that configure the various systems and components of the vehicle, including the ECU;
  read a parameter flag value of the parameter flag and the corresponding CRC value of the parameter flag in dedicated addresses in memory of the ECU;
  read parameter values of the plurality of parameters and corresponding CRC values of the plurality of parameters in dedicated addresses in memory of the ECU;
  calculate CRC values for the plurality of parameters based on parameter values of the plurality of parameters sent to the ECU;
  compare read values of parameter values for the plurality of parameters with expected values of initial parameter values sent to the ECU via instructions;
  compare corresponding CRC values for the plurality of parameters from memory of the ECU with expected values of the CRC values that are calculated via instructions based on initial parameter values for the plurality of parameters; and
  detect invalid values and differences between the read values and the expected values for the parameter flag value of the parameter flag, the corresponding CRC value of the parameter flag, parameter values for the plurality of parameters, and the corresponding CRC values of the plurality of parameters.

17. The system of claim 16, wherein the dedicated addresses in memory of the ECU that store the parameter flag value for the parameter flag, corresponding CRC value of the parameter flag, the parameter values for the plurality of parameters, and the corresponding CRC values of the plurality of parameters have separate, distinct, and different locations in memory, and the parameter values of the plurality of parameters stored in dedicated addresses in memory of the ECU configure control of the actuators and sensors via the one or more controllers.

18. The system of claim 16, wherein the ECU accesses the dedicated addresses in memory to:
  read the parameter flag value of the parameter flag and the corresponding CRC value of the parameter flag;
  write the parameter flag value of the parameter flag and the corresponding CRC value of the parameter flag;
  read parameter values of the plurality of parameters and corresponding CRC values of the plurality of parameters;
  write parameter values of the plurality of parameters and corresponding CRC values of the plurality of parameters;
  calculate the corresponding CRC value for the parameter flag based on the parameter flag value;
  calculate CRC values for the plurality of parameters based on parameter values for the plurality of parameters; and
  detect differences between the corresponding CRC value of the parameter flag and a recalculated value for the parameter flag based on the parameter flag, wherein the differences between the corresponding CRC values of the plurality of parameters and the recalculated value for the corresponding CRC values of the plurality of parameters are based on the parameter values.

19. The system of claim 18, wherein the ECU operates in a calculating mode to calculate or recalculate the corresponding CRC value for the parameter flag and the plurality of parameters via instructions stored in the plurality of memories of the ECU, and the ECU operates in a writing mode to write the parameter flag value for the parameter flag, the corresponding CRC value for the parameter flag, parameter values for the plurality of parameters, and the corresponding CRC values for the plurality of parameters to dedicated addresses in memory via instructions stored in the plurality of memories of the ECU.

20. The system of claim 18, further comprising:
  implementing a first data control scheme in response to detecting no invalid values and no differences between read values and expected values for the parameter flag value of the parameter flag, the corresponding CRC value of the parameter flag, and parameter values of the plurality of parameters, and the corresponding CRC values of the plurality of parameters comprises:
    setting the parameter flag value to a first pre-determined value via instructions of the service tool stored in the computing device;
    writing the parameter flag value of the parameter flag via a writing mode and updating the corresponding CRC value of the parameter flag to an at least one memory of the ECU via a calculating mode and the writing mode;
    comparing and evaluating the parameter flag value of the parameter flag and the corresponding CRC value of the parameter flag via instructions of the service tool stored in the computing device; and
    terminating instructions of the service tool in the computing device in response to a termination condition being satisfied; and
  implementing a second data control scheme in response to detecting invalid values and no differences between read values and expected values for the parameter flag value of the parameter flag, the corresponding CRC value of the parameter flag, and parameter values of the plurality of parameters, and the corresponding CRC values of the plurality of parameters comprises:
    setting the parameter flag value to a second pre-determined value via instructions of the service tool stored in the computing device;
    writing the parameter flag value of the parameter flag via the writing mode and updating the corresponding CRC value of the parameter flag to the at least one memory of the ECU via the calculating mode and the writing mode;
    comparing and evaluating the parameter flag value of the parameter flag and the corresponding CRC value of the parameter flag via instructions of the service tool stored in the computing device;
    entering a data maintenance mode with pre-determined parameter values via the ECU; and
    resending the parameter values for the plurality of parameters and the corresponding CRC values for the plurality of parameters in response to the termination condition being unsatisfied.

* * * * *